W. Kitson.

Fire-Proof Building.

No. 1,796. Reissued Oct. 18, 1864.

Witnesses
J. W. Coombs
G. W. Reed.

Inventor
W. Kitson
per Munn & Co
Attorneys

UNITED STATES PATENT OFFICE.

WILLIAM KITSON, OF LOWELL, MASSACHUSETTS.

IMPROVEMENT IN FIRE-EXTINGUISHERS.

Specification forming part of Letters Patent No. 40,343, dated October 20, 1863; Reissue No. 1,796, dated October 18, 1864.

*To all whom it may concern:*

Be it known that I, WILLIAM KITSON, of Lowell, in the county of Middlesex and State of Massachusetts, have invented certain new and Improved Means of Extinguishing Fire; and I do hereby declare that the following is a full, clear, and exact description of the same, reference being had to the accompanying drawings, forming part of this specification, in which—

Figure 1:
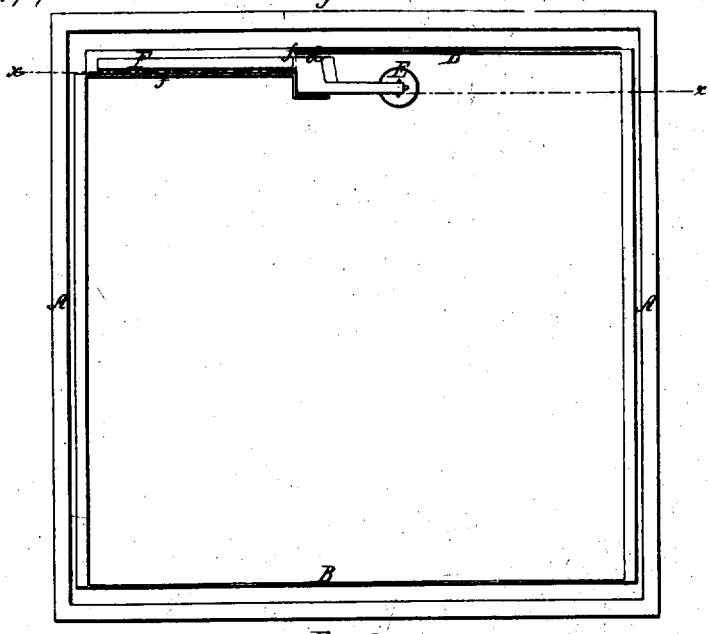
Figure 2:
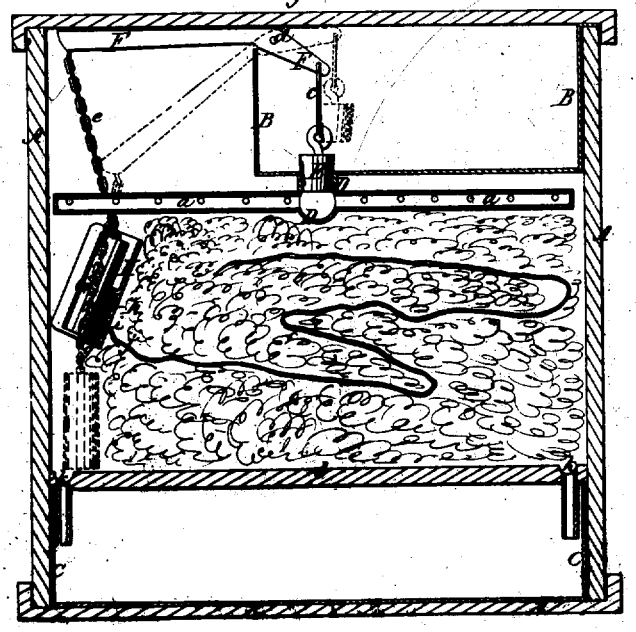

Figure 1 is a plan view of a cotton-bin with the cover removed, showing the application of one form of my invention. Fig. 2 is a vertical section of the same in the plane indicated by the line *x x* in Fig. 1.

Similar letters of reference indicate corresponding parts in the two figures.

The liability to fire in bins for cotton and other fibrous textile materials has been so great that in all modern bins it is customary to place a train of perforated water-pipes, and connect such pipes by a cock or valve with a tank of water, so that in case of fire water may be let into the bin by opening the cock or valve by hand; but there is often so much loss of time before opening the valve that the fire makes considerable headway before the water reaches it. It is obvious that a similar system of pipes and a cock or valve may be applied in any place where fire is likely to occur.

The object of this invention is make such cock or valve self-acting; and to this end it consists in the attachment to such cock or valve of a weight, which, until fire occurs in the bin or other place in or near which the pipes are situated, is supported or held up in a suitable manner, in such combination with a fuse or other combustible or inflammable material placed within the bin or other place as to allow the cock or valve to remain closed, but that when fire occurs there the ignition of such combustible or inflammable material will cause the liberation of the weight, and so permit it to drop, and thereby produce the opening of the cock or valve and permit the admission of the water.

The invention may be applied in a variety of forms, but to enable other persons to apply it to use I will proceed to describe that form which is represented in the drawings as applied to a cottin-bin.

A is the bin, having arranged above it or within its upper part the water-tank B, which is kept constantly filled, and having arranged below its bottom *b* a waste-tank, C.

D is a pipe connected with the bottom of the tank B, and extending all across the bin, just below the said tank. This pipe has numerous branches, *a a*, which are perforated at short intervals for the issue of the water.

E is a valve fitted into the mouth of the pipe D, and kept closed by the weight of the water above it in the tank B until it is required to be opened to admit water from the said tank through the pipe D, and its perforated branches, for the purpose of extinguishing fire in the bin. The valve E is connected by a rod, *c*, with one end of a lever, F, which works on a fixed fulcrum, *d*, secured in one side of the tank B, and the other end of which has a weight, G, attached to it by a chain, *e*, or its equivalent. A portion of the tank B, on the side at which the lever is arranged, is recessed inward, as shown at *f f* in Fig. 1, to permit the arm of the lever to which the valve is attached to work inside and the arm to which the weight is attached to work outside of the tank, and permit the weight to be arranged either within or without the bin.

H is an inclined semi-cylindrical metal box or seat arranged within the bin at a short distance below the bottom of the tank for the reception of the weight, which is made of cylindrical form to fit it. At the bottom of the said box, which is otherwise open, there is a slight inward projection, *g*, for the support of the weight; and within the lower part of the box there is a cavity, *h*, for the reception of a few grains of gun-powder or gun-cotton, and communicating with this cavity there is a vent-hole, *i*, for the reception of the end of a fuse, *j*, which runs in zigzag or serpentine form through and among the cotton or other fibrous material in the bin.

The chain *e* is of such length that it will just allow the weight to rest in the box H when the valve is closed, as shown in black outline in Fig. 2, and this is the condition of the weight and valve until fire occurs in the bin, when the fuse *j*, taking fire, fires the gunpowder or gun-cotton in the cavity *h* of the box H, and blows out the weight, which then drops and pulls down the arm of the lever to which it is attached, and thereby raises the arm to which the valve is attached, and so opens the valve, as shown in red outline in in Fig. 2, and admits water to all parts of the bin, among its fibrous contents, quickly extinguishing the fire. The water drains through the cotton through holes *k k*, in the bottom *b* of the bin into the tank C.

A cock may be substituted for the valve E, and in such case the plug of the cock is arranged horizontally and furnished with a wheel or lever, to which the weight G is attached by a chain.

What I claim as my invention, and desire to secure by Letters Patent, is—

The employment for admitting water to a cotton or other bin or other place, to extinguish fire therein, of a valve or cock which is opened by means of a weight which is set free for the purpose by the ignition of a fuse or other inflammable or combustible material, substantially as herein described.

WILLIAM KITSON.

Witnesses:
CHAS. HUNT,
HORATIO G. F. CORLISS.